(12) United States Patent
Lathwesen

(10) Patent No.: US 11,981,266 B2
(45) Date of Patent: May 14, 2024

(54) DISPLAY DEVICE, VEHICLE AND METHOD FOR OPERATING A DISPLAY DEVICE

(71) Applicant: Bayerische Motoren Werke Aktiengesellschaft, Munich (DE)

(72) Inventor: Harald Lathwesen, Mauern (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/773,787

(22) PCT Filed: Nov. 11, 2020

(86) PCT No.: PCT/EP2020/081718
§ 371 (c)(1),
(2) Date: May 2, 2022

(87) PCT Pub. No.: WO2021/104865
PCT Pub. Date: Jun. 3, 2021

(65) Prior Publication Data
US 2022/0388457 A1 Dec. 8, 2022

(30) Foreign Application Priority Data
Nov. 26, 2019 (DE) ...................... 10 2019 131 925.0

(51) Int. Cl.
*B60R 11/02* (2006.01)
*B60R 11/00* (2006.01)
(52) U.S. Cl.
CPC ... *B60R 11/0235* (2013.01); *B60R 2011/0028* (2013.01); *B60R 2011/0084* (2013.01);
(Continued)
(58) Field of Classification Search
CPC ...... B60K 2370/176; B60K 2370/1868; B60K 2370/21; B60K 2370/52; B60K 2370/797;
(Continued)

(56) References Cited

U.S. PATENT DOCUMENTS 6,304,173 B2 * 10/2001 Pala ..................... B60R 11/0235
348/148
9,442,688 B2 * 9/2016 Rawlinson ............ G06F 3/1454
(Continued)

FOREIGN PATENT DOCUMENTS

EP 2 923 884 A1 9/2015

OTHER PUBLICATIONS

International Search Report (PCT/ISA/210) issued in PCT Application No. PCT/EP2020/081718 dated Feb. 16, 2021 with English translation (four (4) pages).
(Continued)

*Primary Examiner* — Nathnael Aynalem
(74) *Attorney, Agent, or Firm* — Crowell & Moring LLP

(57) ABSTRACT

A display device for the interior of a vehicle includes: (i) a display unit, which is designed for optical display of information and has a display element for this purpose and which can be or is arranged in a longitudinal extension direction of the vehicle behind a front row of seats, preferably on a roof lining of the vehicle; (ii) a movement unit, which is designed to move the display unit, in particular with the display element pivoted away from the roof lining of the vehicle, in the longitudinal extension direction, in particular controllably, between various working positions and/or to hold the display unit in a given working position; and (iii) a control unit which is designed to control the movement unit in such a way that the display unit and the display element are arranged at a predetermined first distance or first distance range from an element of the front row of seats.

10 Claims, 5 Drawing Sheets

(52) U.S. Cl.
CPC ............... *B60R 2011/0092* (2013.01); *B60R 2011/0276* (2013.01)

(58) Field of Classification Search
CPC .............. B60K 35/00; B60K 2370/152; B60K 2370/1526; B60K 2370/1529; B60K 2370/1531; B60K 2370/1533; B60K 2370/736; B60K 2370/739; B60K 2370/48; B60K 2370/67; B60K 2370/771; B60K 2370/1523; B60R 1/00; B60R 2300/70; B60R 2300/80; B60R 2300/802; B60R 11/04; B60R 2001/1215; B60R 11/0235; B60R 2011/0276; B60R 2011/008; B60R 2011/0092; B60R 11/0229; B60R 2011/0028; B60R 2011/0084; B60R 2011/0282; H04N 7/181; G02B 27/01
USPC ........................................................ 348/148
See application file for complete search history.

(56) References Cited

U.S. PATENT DOCUMENTS

| | | | |
|---|---|---|---|
| 2012/0318836 A1* | 12/2012 | Maeda | B64D 11/00153 224/311 |
| 2015/0138043 A1 | 5/2015 | Rawlinson et al. | |
| 2015/0138044 A1 | 5/2015 | Rawlinson et al. | |

OTHER PUBLICATIONS

German-language Written Opinion (PCT/ISA/237) issued in PCT Application No. PCT/EP2020/081718 dated Feb. 16, 2021 (five (5) pages).

German-language Search Report issued in German Application No. 10 2019 131 925.0 dated Oct. 19, 2020 with partial English translation (12 pages).

* cited by examiner

DISPLAY DEVICE, VEHICLE AND METHOD FOR OPERATING A DISPLAY DEVICE

BACKGROUND AND SUMMARY

The present invention relates to a display device for the interior of a vehicle, to a vehicle as such and also to a method for operating a display device.

It is known to fit a display device, assigned to a seat, for the visual display of information in a vehicle, and in particular in a motor vehicle or passenger car in general, on the inner side of the vehicle roof, for example on the roofliner.

Such known display devices are arranged in the operating state at a predefined fixed distance from the viewer, but the chosen, fixed distance is often found to be uncomfortable for many users of such display devices from ergonomic aspects. Although adjusting mechanisms for adapting a viewing distance are sometimes proposed, they do not allow sufficiently flexible handling in consideration of other components in the interior of the vehicle. Also, the installation space that is available overall for the arrangement of the display device is often only used insufficiently.

The invention is based on the object of providing a display device for the interior of a vehicle, a vehicle as such and also a method for operating a display device with which reliable and flexible handling of a display unit fitted on a roofliner is possible by simple means.

The object on which the invention is based is achieved according to the invention in the case of a display device, in the case of a vehicle and in the case of a method for operating a display device, in accordance with the independent claims. Advantageous developments are respectively the subject of the dependent claims.

According to a first aspect of the present invention, a display device for the interior of a vehicle, and in particular a motor vehicle or a passenger car, is provided and is formed with (i) a display unit, which is configured for the visual display of information and has for this purpose in particular a display element, and which can be or is arranged behind a front row of seats in a direction of longitudinal extent of the vehicle, preferably on a roofliner of the vehicle, (ii) a movement unit, which is configured to move the display unit, in particular with the display element pivoted away from the roofliner of the vehicle, along the direction of longitudinal extent, in particular controllably in an open-loop and/or closed-loop manner, between various operating positions and/or to secure it in a given operating position, and (iii) a control unit, which is configured to control the movement unit in an open-loop and/or closed-loop manner in such a way that the display unit and/or the display element are arranged or remain at or are brought to a predetermined first distance or first distance interval from an element of the front row of seats.

With the measures taken according to the invention, handling of a display unit fitted on a roofliner is possible in a reliable and flexible way without great additional effort.

In particular, the control device can be designed to check repeatedly and/or continuously a distance of the display unit and/or the display element from a front row of seats, and in particular from an element of the front row of seats, for example a headrest or the like, in order—in particular potentially taking into consideration further boundary conditions—to correct the position of the display unit and/or the display element to maintain a distance or a distance interval in its operating position.

According to embodiments of the present invention, the predetermined first distance may be a predetermined minimum distance. This may be for example a distance which ensures that, even when there is changing loading in the front row of seats, for example when there is movement of a front occupant and/or on account of the elasticity of a front seat, no contact takes place between an element of the front row of seats, for example a headrest, and the display unit and/or the display element.

Additionally or alternatively, the predetermined first distance may be a distance between a headrest of a driver's seat and/or a front-passenger seat on the one hand and the display unit and/or the display element on the other hand.

According to another advantageous exemplary embodiment of the display device according to the invention, the control unit may be designed to control the movement unit in an open-loop and/or closed-loop manner in such a way that the display unit and/or the display element are arranged or remain at or are brought to a predetermined second distance or second distance interval from an element of a rear row of seats and/or from an occupant or a passenger of a rear row of seats. It is ensured by these measures that a passenger or occupant does not experience any feeling of oppression due to an overly close presence of the display unit and/or the display element, as a result of which the comfort of the occupant or passenger is further enhanced.

In particular, the control device may in this case be designed to check repeatedly and/or continuously a distance of the display unit and/or the display element from the rear row of seats, in particular from an element of the rear row of seats, for example a headrest or the like, and/or from a passenger in the rear row of seats and/or the headroom of such a passenger, in order—in particular potentially taking into consideration further boundary conditions—to correct the position of the display unit and/or the display element to maintain a distance or a distance interval in its operating position.

In principle, all measures that are suitable for checking the distances to be maintained can be used. This may take place on the one hand by means of explicit measuring operations and alternatively or additionally by the recording of control data, which serve for setting the rows of seats and their elements.

In the case of a preferred embodiment of the display device according to the invention, it is formed with a sensor unit or a first operative connection—for example by one or more recording and/or control lines—to a sensor unit, wherein the sensor unit is designed to record a distance of the display unit and/or the display element at the time from the element of the front row of seats, from the element of the rear row of seats and/or from the passenger in the rear row of seats and to transmit a signal that is representative of the distance to the control unit. On the basis of the signal that is representative of one or more distances, the movement unit can—in particular mediated by the control unit—be controlled in an open-loop or closed-loop manner in order to achieve or ensure the required maintenance of the distances or distance intervals by correspondingly correcting the display unit and/or the display element.

According to another advantageous development of the display device according to the invention, it may additionally or alternatively be formed with a second operative connection—for example by one or more recording and/or control lines—to a control unit of an element and in particular a seat in a front row of seats and be designed to control the movement unit, and in particular as a consequence a position, orientation and/or operating position of the display unit and/or the display element, in dependence on control data of the control unit for setting the element and in particular the seat in the front row of seats.

In this case, it may in particular be contemplated that, during the operation of the display device, even when there is a sudden adjustment of a front seat, the new seat position is taken into consideration, in that, by checking and/or correcting the position of the display unit and/or the display element, maintenance of the distances and/or distance intervals takes place with as little delay as possible.

Additionally or alternatively, according to another development of the display device according to the invention, the movement unit may be designed—in particular mediated by the control unit—to move the display unit and/or the display element from an operating position—in particular pivoted away from the roofliner of the vehicle—into a non-operating position, preferably parallel to the roofliner of the vehicle, and vice versa.

In the event that, due to adjustment of the seat positions in the front row seats, but also in the rear of seats, the useful space for operation of the display unit is no longer appropriate or sufficient, for example because the boundary conditions with regard to the first and second distances can no longer be maintained, the characteristics of this embodiment can be used in particular to pivot the display unit and/or the display element back from the operating position into the safer non-operating position parallel to the roofliner of the vehicle.

In principle, the concept according to the invention can be used in the case of all display devices that take up a certain operational and installation space in the interior of the vehicle during operation.

The present invention has however been found to be particularly advantageous in those cases in which the display unit is formed with a substantially rectangular shape, with transverse edges aligned parallel to a direction of transverse extent of the vehicle in the state of the display device in which it is mounted on the assigned vehicle and/or with longitudinal edges aligned parallel to a direction of longitudinal extent of the assigned vehicle in the state of the display device in which it is mounted on the assigned vehicle.

For trouble-free operation, in particular with regard to a fully automatic changeover of the display unit and/or the display element between the operating positions and the non-operating position, in the case of another embodiment of the display device according to the invention a drive unit is formed, designed for driving the movement unit and/or controllable in an open-loop and/or closed-loop manner during its operation by way of the control unit.

According to another aspect of the present invention, a vehicle is also provided, having a body, an interior formed by the body with a roofliner and also a display device provided on or in the roofliner and designed according to the invention.

According to another alternative or additional aspect of the present invention, a method for operating a display device for the interior of a vehicle is provided, wherein
(a) the display device is formed with a display unit, which is designed for the visual display of information and has for this purpose a display element, and which can be or is arranged behind a front row of seats in a direction of longitudinal extent of the vehicle, preferably on a roofliner of the vehicle,
(b) the display device and/or the display element is or are moved, in particular by way of a movement unit and/or with the display element pivoted away from the roofliner of the vehicle, along the direction of longitudinal extent controllably in an open-loop and/or closed-loop manner between various operating positions and/or is or are secured in a given operating position, and
(c) moving of the display unit and/or the display element, in particular by means of a control unit, is controlled in an open-loop and/or closed-loop manner in such a way that the display unit and/or the display element are arranged or remain at or are brought to a predetermined first distance or first distance interval from an element of the front row of seats.

Further details, features and advantages of the invention will emerge from the following description and the figures.

DETAILED DESCRIPTION OF THE DRAWINGS

Exemplary embodiments and the technical background of the invention are described in detail below with reference to FIGS. 1 to 5. Identical and equivalent and identically or equivalently acting elements and components are denoted by the same designations. The detailed description of the denoted elements and components is not reproduced each time they occur.

The features shown and further characteristics may be isolated from one another in any form and combined with one another in any desired manner without departing from the core of the invention.

Figure 1:
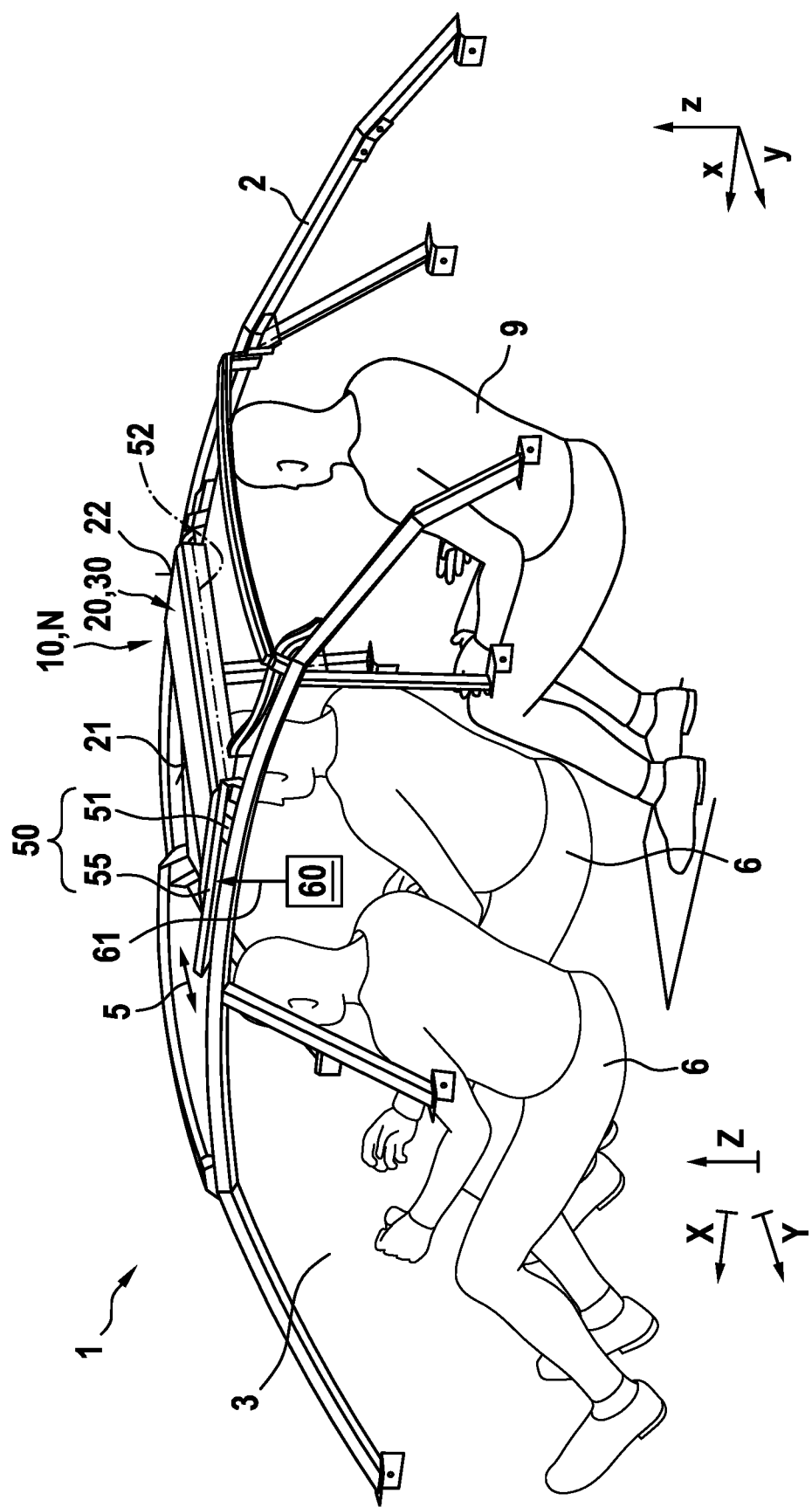
FIGS. 1 and 2 show in a schematic and perspective side view an embodiment of the vehicle according to the invention, which is equipped with an embodiment of the display device according to the invention, wherein the display device is arranged in various positions in the interior of the vehicle.
Figure 2:
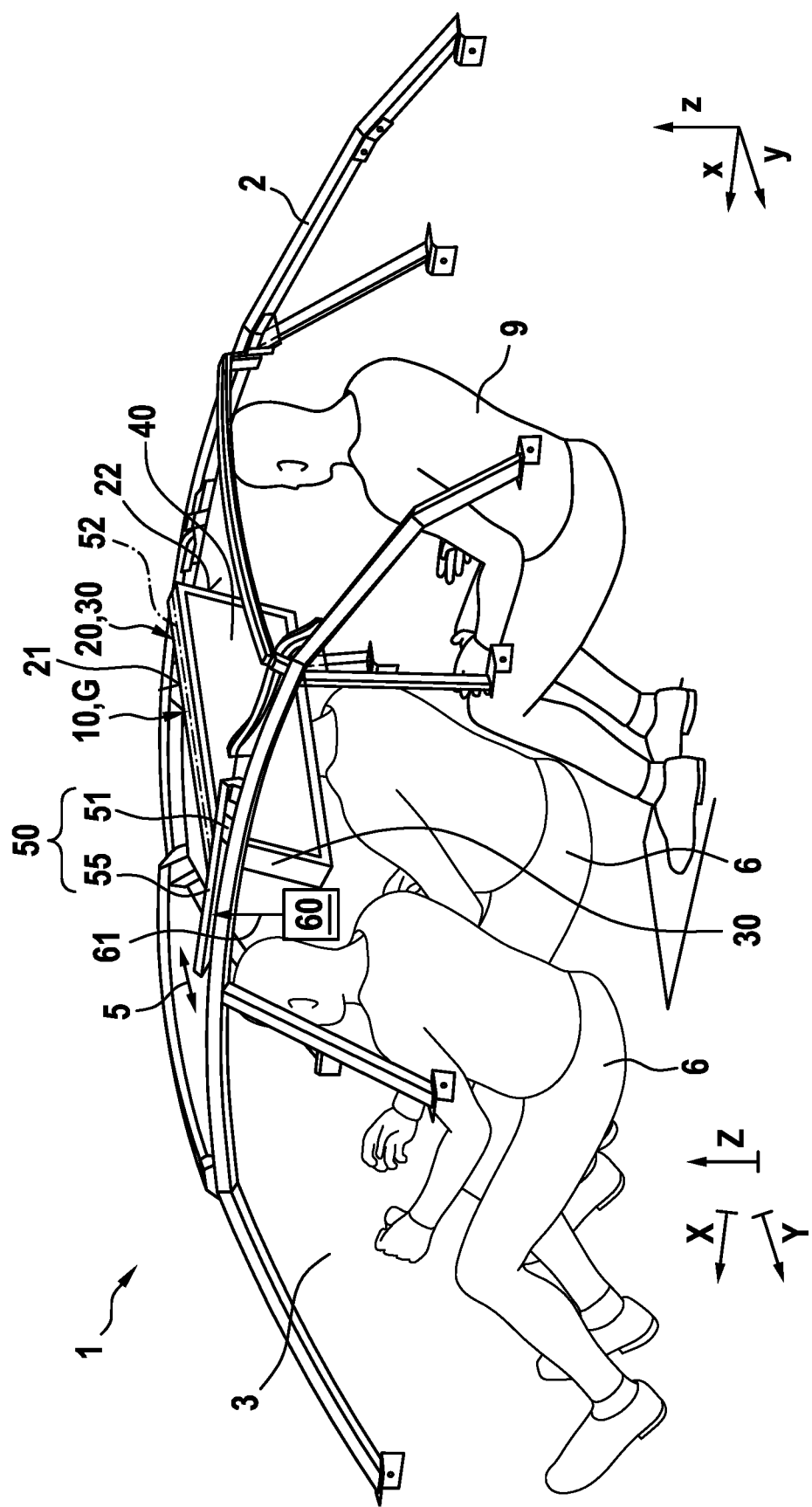

FIGS. 1 and 2 show in a schematic and perspective side view an embodiment of the vehicle 1 according to the invention, which is equipped with an embodiment of the display device 10 according to the invention, wherein the display unit 20 of the display device 10 is arranged in various positions N, G in the interior 3 of the vehicle 1.

In all of the figures, and in particular in FIGS. 1 and 2, the vehicle 1 is schematically represented by components of a body 2 which form and surround an interior 3 of the vehicle 1 and define a roofliner 5.

The respective vehicle 1 extends in a direction of longitudinal extent X parallel to the x direction, in a direction of transverse extent Y parallel to the y direction and also in a vertical direction Z parallel to the z direction, which are defined by the respectively indicated three directional arrows.

A respectively shown display device 10 is formed in the representations of FIGS. 1 and 2 by the actual display unit 20, for example by a carrier 30, which carries a display element 40, for example a monitor or a screen, as can be seen from FIG. 2.

Here, the display unit 20 is of a substantially rectangular shape, with longer transverse edges 21 parallel to the direction of transverse extent Y of the vehicle 1 and with shorter longitudinal edges 22 parallel to the direction of longitudinal extent X of the vehicle 1.

Also a component part of the display device 10 is a movement unit 50. In the case of the embodiment shown in FIGS. 1 and 2, this is formed inter alia by two guide rails 55, in which guide elements 51 run.

In the case of this embodiment, the guide rails 55 are formed identically, have a linear shape with the same length, are arranged parallel to one another and flush with the roofliner 5 and respectively form a guideway. In principle, curved guide rails 55 are also contemplated. In the case of the embodiment of FIGS. 1 and 2, the guide rails 55 extend in the longitudinal direction of extent X of the vehicle 1. They are located at a distance from one another in the direction of transverse extent Y at the sides of the roofliner 5, that is to say in particular at the transition from the roof to the side of the vehicle.

The guide elements 51 are formed for example as sliders and are designed for being received in the respective guide rail 55 and moved therein or to move therein along the respective guideway.

In the region of a first transverse edge 21 of the display unit 20, the guide elements 51 are provided in a rotatably mounted manner on the display unit 20 in such a way that a pivot axis or rotation axis 52 of the display unit 20 is thereby defined. Fitting takes place in particular on that transverse edge 21 of the display unit 20 that lies on a side which is assigned to the rear passenger compartment of the vehicle 1 and is facing the rear passenger compartment side of the vehicle 1 during the fitting of the display unit 20 on the vehicle 1. The fitting of first guide elements 51 preferably takes place in the proximity of the opposing longitudinal edges 22 of the display unit 20, in particular that is to say in the intersection region, as it were, of the longitudinal edges 22 and the transverse edges 21.

The arrangement comprising first and second guide elements 51 and possibly coupling levers and also the guide rails 55 with guideways creates the possibility when moving the guide elements 51 in the guide rails 55 of changing between a non-operating position N and one or more operating positions G of the display unit 20, wherein various angles of inclination with respect to the roofliner 5 and/or various lateral positions along the guide rails 55, and consequently in the case of fitting in a vehicle 1 along the direction of longitudinal extent X of the vehicle 1, can be adopted.

In FIG. 1, the display element 20 is in a non-operating position N, to be specific in a state in which the display unit is aligned substantially parallel to the roofliner 5.

When changing over to an intermediate state, the display unit 50 is pivoted away from the roofliner 5 into the passenger compartment 3 by correspondingly moving the first and second guide elements 51 in the guide rail 55, in order to adopt a first operating position G.

When changing over to the intermediate state shown in FIG. 2, the display unit 20 is pivoted away from the roofliner 5 by a greater angle and is brought into a more perpendicularly aligned further operating position G.

When changing over to other states, a displacement alone, without changing the angle of inclination, can be brought about by simultaneously moving the first and second guide elements 51, and in particular by movement at the same speed and over the same distance, so that the viewing distance of an occupant 9 sitting in the rear of the vehicle 1 can be adapted, and in particular increased.

In principle, in the embodiments of FIGS. 1 and 2, the control unit 60 for controlling the movement unit 50 is formed with corresponding operative connections, for example a recording and/or control line 61 (only purely schematically represented there).

Figure 3:
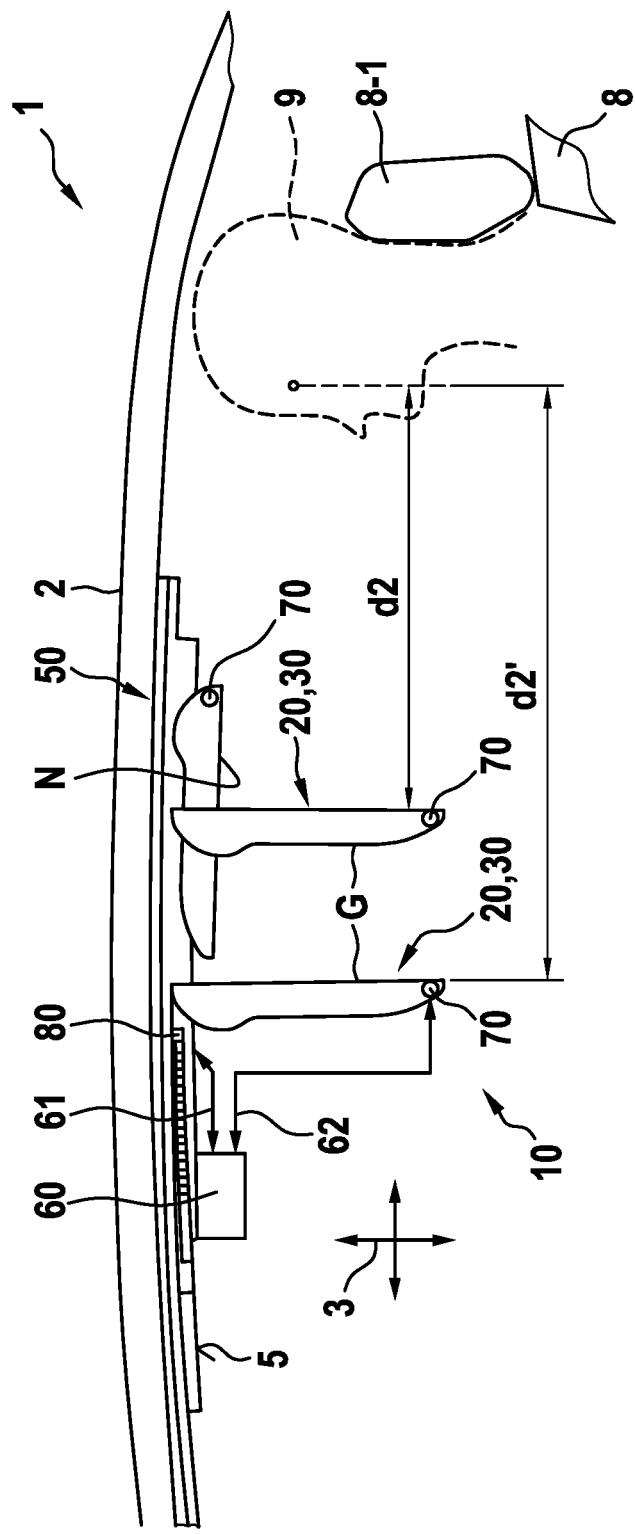
FIGS. 3 to 5 show in a schematic and partially sectional side view various setups of the display device in conjunction with a vehicle equipped according to the invention.
Figure 4:
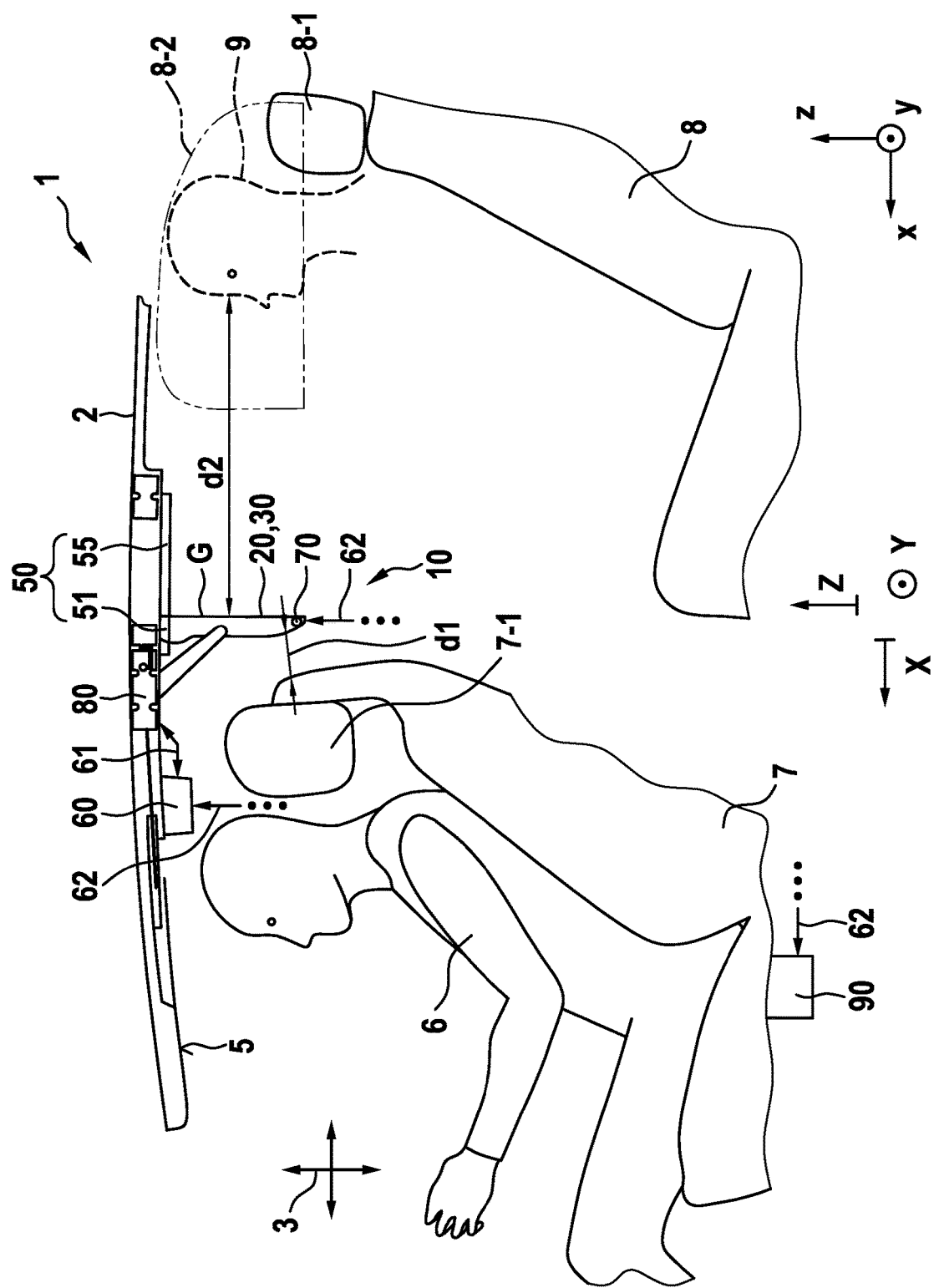
Figure 5:
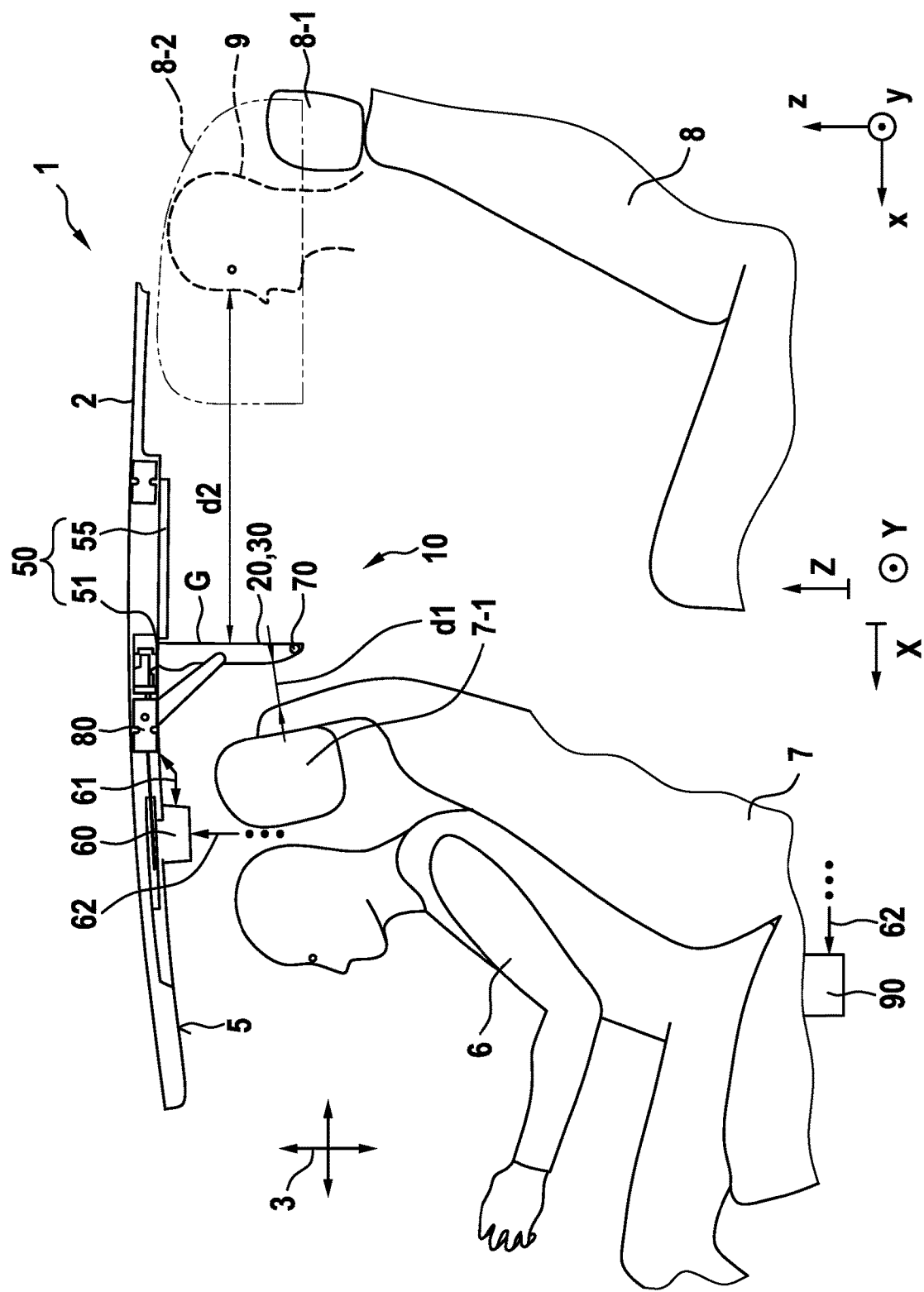

Details of this emerge in conjunction with the embodiments of the display device 10 according to the invention shown in FIGS. 3 to 5 and the vehicles 1 according to the invention fitted out there.

In this respect, FIGS. 3 to 5 show various setups of the display device 10 in a schematic and partially sectional side view in conjunction with a respective vehicle 1.

Shown in FIGS. 3 to 5 are various scenarios in which the display device 10 (and the respective display unit 20 with the display element 40 on the carrier 30) is positioned in the interior 3 and on the roofliner 5 of the vehicle 1, depending on the operating conditions.

In this case, the display unit 20 may adopt a non-operating position N parallel to the roofliner 5, to be specific by means of the operation of the movement unit 50 and in particular the control of the drive 80 with the control unit 60, by using a first recording and/or control line 61 as the operative connection.

Also provided in the representations of FIGS. 3 to 5 are second operative connections, to be specific in the form of second recording and/or control lines 62, between the control unit 60 and a sensor unit 70 or alternatively or additionally a control unit 90 for the front row of seats 7 and the corresponding elements 7-1, for example a headrest.

The sensor unit 70 may serve the purpose of detecting a first distance d1 between the display unit 20 and the front row of seats 7 or the element 7-1.

Additionally or alternatively, the sensor unit 70 may also be designed to determine a first distance d2 from the display unit 20 to the rear row of seats 8 and an element 8-1, for example a headrest, and/or to a headroom 8-2 of a person 9 sitting at the rear. In this way, a measure, as it were, of a comfortable viewing distance is defined.

According to FIG. 3, this comfortable viewing distance can be varied, for example between two different positions with the distances d2 and d2'. This may also take place in dependence on the minimum possible first distance d1.

With the measures of the present invention, the interior 3 of a vehicle 1, which is very confined, can be used better. The front seats 7 cover a large proportion of the interior 3 over their area of adjustment for adaptation to people of different sizes and their usual postures. With a fixed display 20 or a simple folding mechanism, the monitor 40 must be arranged behind the maximum area of adjustment. This has the effect of relocating the display 20 a long way to the rear, and consequently for most people unnecessarily shortening the viewing distance from the rear passenger compartment.

Seats 7 in the front row and the display mechanism in the sense of the movement unit 50 designed according to the invention possibly have a control unit 60 or 90, by which movements are correspondingly controlled.

According to the invention, both control units 60 and 90 may be enabled to calculate on the basis of the adjustment a characteristic point and/or a characteristic surface area on the respective components which is or are suitable for maintaining a distance between the two components.

In this way, the display 20 on the roof or roofliner 5 can be set to a distance from the headrest 7-1 of the two front seats 7 of for example 70 mm. Should one of the two front seats 7 be moved or tilted to the rear, the distance is reduced and the display 20 starts its evasive movement to the rear.

LIST OF DESIGNATIONS

1 Vehicle
2 Body
3 Interior
5 Roofliner
6 Front passenger/occupant
7 Front seat/row of seats
7-1 Front headrest
8 Rear seat/row of seats
8-1 Rear headrest
8-2 Rear headroom
9 Rear passenger/occupant
10 Display device
20 Display unit
21 Transverse edge
22 Longitudinal edge
30 Carrier
40 Display element, monitor, screen
50 Movement unit
51 Guide element
52 Rotation axis/pivot axis
55 Guide rail
60 Control unit
61 Operative connection, recording and/or control line
62 Operative connection, recording and/or control line
70 Sensor unit
80 Drive unit
90 Control unit for the seat/the front row of seats
G Operating position
N Non-operating position
x Spatial direction
X Direction of longitudinal extent of the vehicle 1
Y Spatial direction
Y Direction of transverse extent of the vehicle 1
z Spatial direction
Z Direction of vertical extent of the vehicle 1

The invention claimed is:

1. A display device for an interior of a vehicle, comprising:
   (i) a display unit, which is configured for visual display of information and which is arranged behind a front row of seats in a direction of longitudinal extent of the vehicle on a roofliner of the vehicle;
   (ii) a movement unit, which is configured to move the display unit along the direction of longitudinal extent controllably in an open-loop and/or closed-loop manner between various operating positions and/or to secure the display unit in a given operating position; and
   (iii) a controller, which is configured to move the display unit, via the movement unit, to a predetermined first distance between an element of the front row of seats and the display unit or a predetermined first distance interval between the element of the front row of seats and the display unit, so that the display unit is arranged or remains at or is brought to the predetermined first distance or the predetermined first distance interval.

2. The display device according to claim 1, wherein the predetermined first distance is:
   (i) a predetermined minimum distance, and/or
   (ii) a distance between a headrest of a driver's seat and/or a front-passenger seat on the one hand and the display unit and/or a display element thereof on the other hand.

3. The display device according to claim 2, wherein the controller is configured to control the movement unit such that the display unit and/or the display element thereof are arranged or brought to a predetermined second distance or second distance interval from an element of a rear row of seats and/or from an occupant of a rear row of seats.

4. The display device according to claim 3, further comprising:
   a sensor or a first operative connection to a sensor, wherein
   the sensor is configured to record a distance of the display unit and/or the display element thereof at the time from the element of the front row of seats, from the element of the rear row of seats, and/or from the passenger in the rear row of seats and to transmit a signal that is representative of the distance to the controller.

5. The display device according to claim 4, further comprising:
   a second operative connection to a controller for setting a seat in a front row of seats, wherein
   the movement unit is controlled, and as a consequence a position, orientation and/or operating position of the display unit and/or the display element thereof, in dependence on control data of the controller for setting the seat in the front row of seats.

6. The display device according to claim 1, wherein the movement unit is configured to move the display unit and/or a display element from an operating position into a non-operating position.

7. The display device according to claim 1, wherein, the display unit is formed with:
   (i) a substantially rectangular shape,
   (ii) transverse edges aligned parallel to a direction of transverse extent of the vehicle in the state of the display device in which it is mounted on the assigned vehicle, and/or
   (iii) longitudinal edges aligned parallel to a direction of longitudinal extent of the assigned vehicle in the state of the display device in which it is mounted on the assigned vehicle.

8. The display device according to claim 1, further comprising:
   a drive, which is configured for driving the movement unit and/or is controllable in an open-loop and/or closed-loop manner by way of the controller.

9. A vehicle, comprising:
   a body;
   an interior formed by the body with a roofliner; and
   a display device according to claim 1,
   wherein the display device is on or in the roofliner.

10. A method for operating a display device for an interior of a vehicle, comprising:
    (a) providing the display device with a display unit for visual display of information, which is arranged behind a front row of seats in a direction of longitudinal extent of the vehicle on a roofliner of the vehicle;
    (b) moving the display device, by way of a movement unit, along the direction of longitudinal extent controllably in an open-loop and/or closed-loop manner between various operating positions and/or securing the display unit in a given operating position; and
    (c) controlling the moving of the display unit, via a controller, to a predetermined first distance between an element of the front row of seats and the display unit or a predetermined first distance interval between the element of the front row of seats and the display unit, so that the display unit is arranged or remains at or is brought to the predetermined first distance or the predetermined first distance interval.

\* \* \* \* \*